May 11, 1954  R. R. COUCH  2,678,019
HORIZONTAL CYCLOIDAL BLADE PROPULSION ASSEMBLY
Filed May 25, 1951  4 Sheets-Sheet 1
FIG. 1.
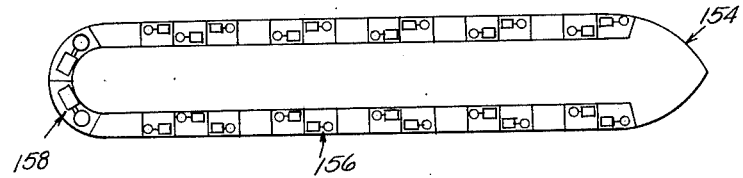
FIG. 2.
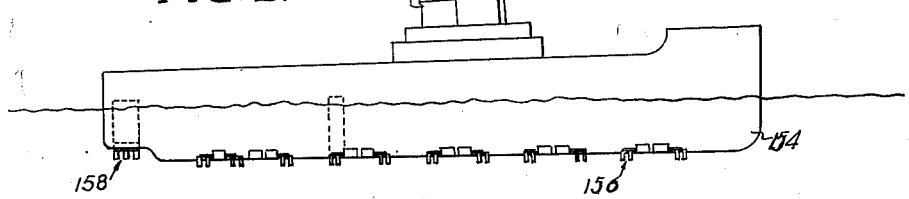
FIG. 3.
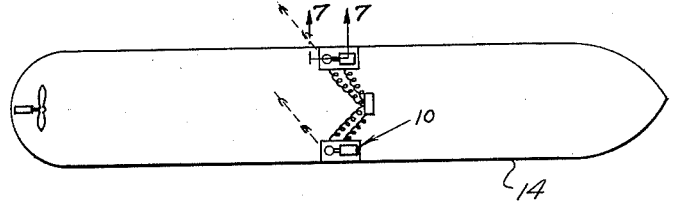
FIG. 4.
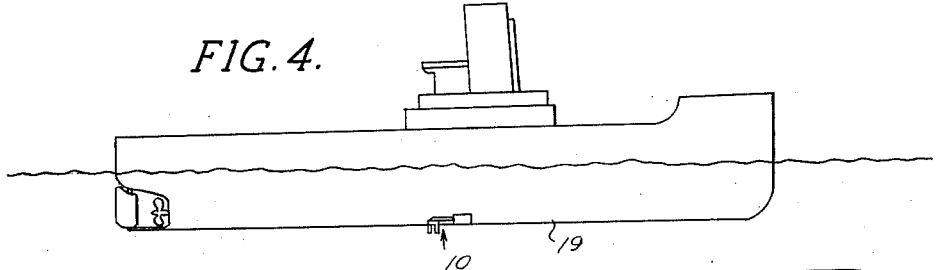
FIG. 19.
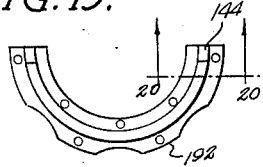
FIG. 5.
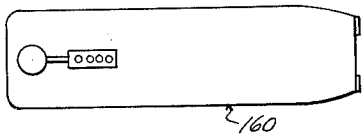
FIG. 6.
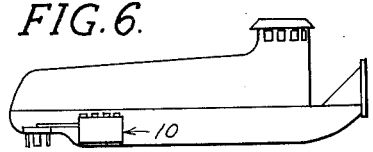
FIG. 20.
FIG. 21.
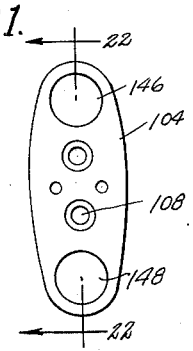
FIG. 22.
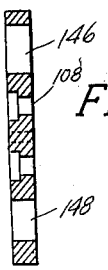
INVENTOR.
ROBERT R. COUCH,
BY
McMorrow, Berman + Davidson
ATTORNEYS.

May 11, 1954 R. R. COUCH 2,678,019
HORIZONTAL CYCLOIDAL BLADE PROPULSION ASSEMBLY
Filed May 25, 1951 4 Sheets-Sheet 2

INVENTOR.
ROBERT R. COUCH,
BY
McMorrow, Berman + Davidson
ATTORNEYS.

May 11, 1954   R. R. COUCH   2,678,019
HORIZONTAL CYCLOIDAL BLADE PROPULSION ASSEMBLY
Filed May 25, 1951   4 Sheets-Sheet 3

INVENTOR.
ROBERT R. COUCH,
BY
McMorrow, Berman + Davidson
ATTORNEYS.

May 11, 1954  R. R. COUCH  2,678,019

HORIZONTAL CYCLOIDAL BLADE PROPULSION ASSEMBLY

Filed May 25, 1951  4 Sheets-Sheet 4

INVENTOR.
ROBERT R. COUCH,
BY
McMorrow, Berman & Davidson
ATTORNEYS.

Patented May 11, 1954

2,678,019

UNITED STATES PATENT OFFICE 2,678,019

HORIZONTAL CYCLOIDAL BLADE PROPULSION ASSEMBLY

Robert R. Couch, Corning, N. Y.

Application May 25, 1951, Serial No. 228,173

5 Claims. (Cl. 115—50)

This invention appertains to combined cycloidal ship propulsion and steering assemblies and has for its primary objects to simplify their fabrication and save fuel, also to increase the maneuverability and stability of ships so as to obviate the necessity of employing docking tugs and to increase the cargo space of ships while effecting, in view of the operational performance thereof, a saving in weight.

Another object of this invention is to provide a cycloidal propeller unit that is easily installed on any type of ship in a manner so as to be replaceable without putting the ship in land or dry dock and in a manner so as to be vibrationless and easily repaired.

Another object of this invention is to provide a cycloidal propeller unit conspicuous by the absence of expensive parts and given to mass production.

Another object of this invention is to provide a cycloidal propeller unit in which the blades are designed to break below the water seal upon grounding of the ship.

Another object of this invention is to provide a cycloidal blade propeller than can be operatively mounted in any type of hull regardless of the contour thereof and which is designed for fast, floating replacement and repair.

In the accompanying drawings:

Figure 1 is a diagrammatic view in top plan of a cargo vessel showing a plurality of cycloidal blade units placed in rows along the bilge thereof for propelling and stabilizing the vessel;

Figure 2 is a diagrammatic side elevational view of the cargo vessel;

Figures 3 and 4 are top plan views and side elevational views of a vessel having the cycloidal propeller units arranged in transversely spaced side by side relationship for propelling and stabilizing the vessel;

Figures 5 and 6 are top plan and side elevational views of a single cycloidal propeller unit in a driving and steering position on a boat;

Figure 19 is a plan view of a cam for effecting independent rotation of the blades;

Figure 20 is a cross sectional view taken on the line 20—20 of Figure 19;

Figure 21 is a top plan view of an actuating member mounted transversely on the blade hubs for effecting individual rotation of the blades, and Figure 22 is a sectional view taken on line 22—22 of Figure 21.

Figure 7:
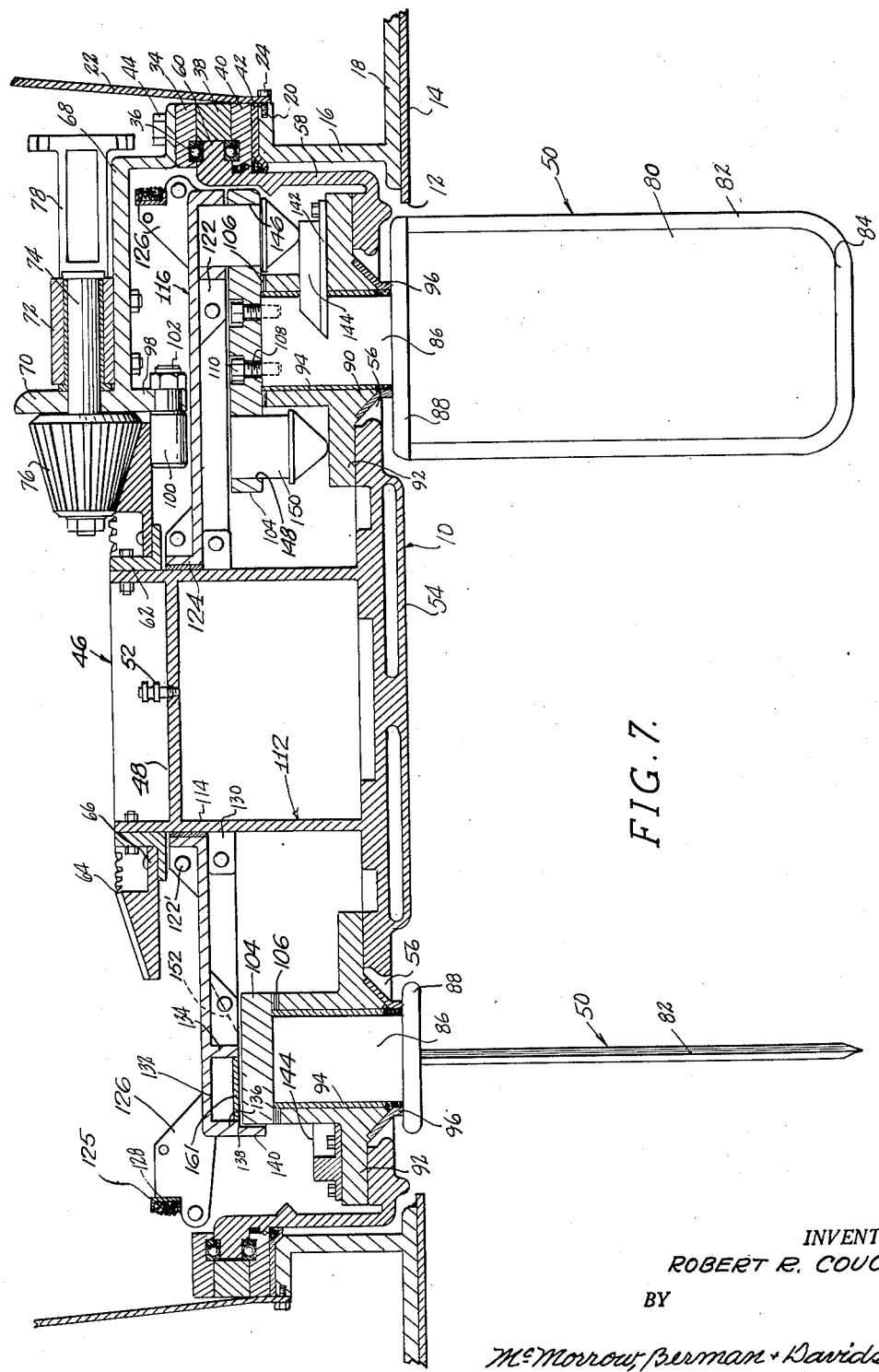
Figure 7 is an enlarged cross sectional view taken on the line 7—7 of one of the propeller units of Figure 3.

The cycloidal blade propeller unit 10 is designed for peak effectiveness and performance by placing the blades near the periphery of a revolving horizontal flat bottom drive drum mounted in an opening 12 in the bottom 14 of the hull. Each blade is revolved 180° about a vertical axis upon each revolution of the drum and each blade is thus able, in a timed operation, to perform efficiently on its entire length. The blades being equally spaced are at all times in unison applying a propelling force for, as one blade applies its peak propelling force, the opposing blade on the drum is knifing through the water. Assurance of smooth performance is thus obtained.

By attaching tiller cable or other linkage to a steering drum concentrically rotatable on the drive drum and providing a connecting actuator between the steering drum and the blades, the blades can be rotated on their vertical axis 180° at each revolution of the drive drum. Thus, the propelling force can be directed in any direction and utilization of a rudder and reversing gearing is obviated.

Referring now more particularly to the accompanying drawings, the cycloidal blade assembly 10 mounted in the hull opening 12 includes a bearing ring 16 having a mounting flange 18 fixed on the hull circumscribing the opening. A supporting flange 20 is laterally formed on the upper end of the ring paralleling the flange 18. To repair the unit 10 or to effect the removal of one of the blade units 50 for replacement, the lower end of a retaining wall 22 is mounted on the outer edge thereof by fasteners 24. The wall 22 is concentric to the opening and encompasses the unit 10, the wall being fabricated of easily disassembled sections and of a height sufficient to prevent water from entering the hull.

An upthrust bearing retainer 34, having grooves in its lower surface for receiving the ball bearings 36, is mounted on a spacer 38, the spacer being interposed between the retainer ring 40 having grooves for receiving similar ball bearings 36. The ring 40 is mounted on the flange 20 and spaced from engagement therewith by a shim 42. The retainers are bolted on the flange 20 by the bolts 44 and provide a supporting means for a drive drum tube 46. The cylindrical drive drum tube 46 is provided with transverse partition 48 having a swivel fitting 52 for receiving a lubrication suction line. A flat bottom 54 is formed transversely on the drum and is rotatably disposed within the opening 12, the bottom having equidistantly spaced elliptical openings 56 formed therein, the openings 56 being concentric to the drum and accommodating the blade units 50. A peripheral upstanding flange 58 is formed on the bottom and terminates in a lateral outwardly directed lip 60 which is journaled between the ball bearings in the thrust bearings to rotatably mount the drum in the opening.

An annular angle iron 62 is circumposed on the drum adjacent the upper end thereof and bolted thereto for supporting on its horizontal flange a driving ring gear 64 which has a flange 66 bolted to said horizontal flange. A bracket 68 is mounted on the upward thrust retainer 34 and projects inwardly therefrom, the bracket having an upstanding apertured flange 70 formed on its inner end. A bearing sleeve 72 is fixed on the upper face of the bracket in alignment with the aperture in the flange for the reception therewith of a driving shaft 74. A pinion 76 is fixed on one end of the shaft in engagement with the ring gear and a drive sleeve 78 is formed on the other end for operative association with a power source. An apertured flange 98 depends from the bracket and a roller 100 is in near engagement under the base of the ring gear, the roller being journaled on a shaft 102 carried by the flange 98. The roller retains the gear and pinion 76 in meshing engagement under occasional peak loads. Rotation of the shaft by a power source effects a rotation of the drive drum, rotating in the opening 12 and mounted in the bearings.

Blade units 50 are carried by the bottom of the drive drum and include a flat fabricated steel or cast thin blade 80 having faired side edges 82 and a depending end edge 84. The blades are continually submerged in the water and are whirled in the water, in unison, by the rotating bottom on the drive drum. A hollow round hub 86 is on the top of the blades and is inserted through the openings 56 in the bottom with a flange 88 formed on the lower end of the hub. A bearing sleeve 90 receives the hub and has a lateral mounting flange 92 bolted on the upper surface of the bottom of the drive drum. A bushing 94 is interposed between the hub and sleeve and a packing retainer ring 96 is attached to the sleeve and contacts the flange 88.

Guide bars or heads 104 are mounted transversely on the hubs of the blades and spaced out of contact therewith by spacers 106, which absorb the wear and aid the lubrication of the hubs. The bars 104 are formed with vertical bores 108 to receive the bolts 110 anchoring the bars on the hubs, the bores being counterbored to accommodate the heads of the bolts.

In association with the guide bars, rotatable control means 112 is provided for rotating the blades individually about their vertical axes represented by the hubs, the blades being rotated on their vertical axes 180° at each revolution of the drive drum. In this manner, the propelling force is achieved and may be directed in any direction by rotating the control means.

The means 112 includes an annular bushing 114 concentrically disposed on the drive drum beneath the angle iron 62. A sectional cam plate 116 is eccentrically circumposed on the drive drum, the cam plate 116 embodying two half sections 118 and 120 having complementary ears 122 along the meeting edges. The ears 122 adjacent the outer portions of the sections 118 and 120 are fastened together while the ears 122 adjacent the inner portions of the sections of the cam plate 116 are attached to complemental flanges 122' on an upstanding annular flange 124 which is formed on the sections 118 and 120 and rotatably encompasses the bushing 114.

An angular annular flange 125 surrounds the cam plate 116 and is positioned thereabove, the flange being connected to ribs 126 radiating outwardly from the periphery of the aforesaid cam plate. A tiller cable 128 is coiled about the flange 125 to effect a rotation of the cam plate.

The cam plate rests on the supports 130 carried by the drive drum and is formed on the underside of its periphery with a channel 132, including legs 134 and 136. A shoulder 138 is defined by an annular depending extension 140 of the leg 136, the extension 140 selectively engaging the guide bars 104 upon rotation of the cam plate, in a manner to be discussed.

Arcuate cam members 142 are mounted on each of the bearing mounting flanges 92, as seen in Fig. 7, the members being T-shaped and having the horizontal portion bolted on the upper surfaces of the flanges. The upstanding portion 144 of the members forms a cam ledge and is provided with an inclined lifting end and departure end and a flat riding surface. Vertical openings 146 and 148 are formed in the opposing ends of the bars 104 and guide pins 150 are slidably mounted therein, the pins having conical heads adapted to bear on the cam ledge. The pins are movable into the channel 132 upon engagement of the cam ledges by the heads of the pins so that rotation is imparted to the blades by the cam plate in an individual fashion, with the bars effecting such movement. It is to be noted that the arcuate cam member 142 and bar 104 with its slidable pins 150 carried by the top of the adjacent blade hub 86 constitutes a separate means operatively connected to the sleeve in the adjacent blade hub for individually rotating the blade about its axis to effect a change in the direction of propulsion, and that the means or channel 132 on the cam plate 116 selectively engages such separate means for effecting the individual rotation of each of the blades.

Also, by actuating the cable 128, the cam plate is moved about the drive drum and as the drive drum rotates the blades, the pins 150 are alternately raised by the cam 142. By rotating the plate, the timing of the blades may be changed and the resultant propelling force thus be applied in any direction.

In operation, drum 46 is rotated by the drive means to revolve the blades, as a propulsion unit, about a common orbit. The cam plate 116 is retained stationary by the tiller cable 128, which are operatively connected to a steering mechanism.

The drum rotates in a counterclockwise direction and the rotation of the cam plate controls the direction of propulsion, so that, by rotating the cam plate 180°, the resultant force of the blades would be reversed.

For ease of assembly and disassembly and to facilitate the removal and replacement of the blade units, the cam plate is made in two pieces. Thus, one section of the cam plate can be removed, and, after removing the attaching studs, the hub plate and guide bar therefor can be removed and replaced with a spare. The entire propeller assembly can be removed by removing bolts 44.

Figure 8:
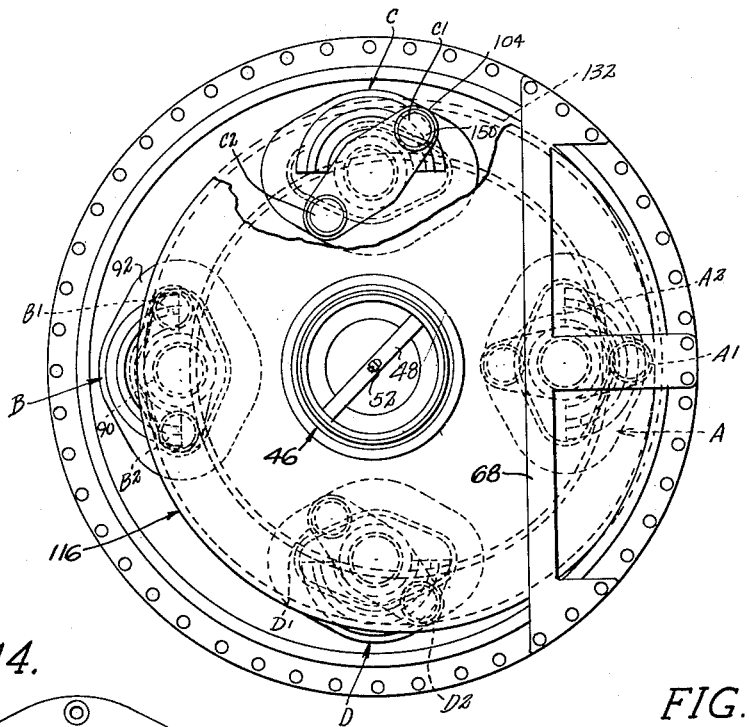
Figure 8 is a top plan view of the propeller unit of Figure 7 with the ring gear and pin assembly associated therewith, and the ribs of the cam plate and annular flange removed.
Figure 14:
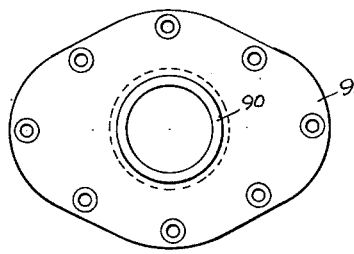
Figure 14 is a plan view of one of the propeller blade hub bearings.
Figure 16:
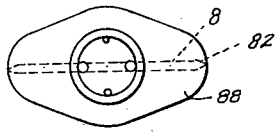
Figure 16 is a top plan view of one of the blades.
Figure 17:
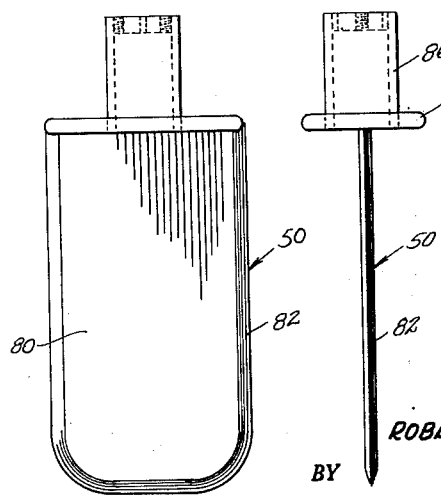
Figure 17 is a front elevational view of the blade.
Figure 15:
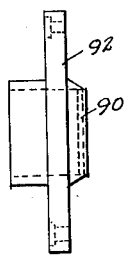
Figure 15 is an end elevational view thereof.
Figure 18:
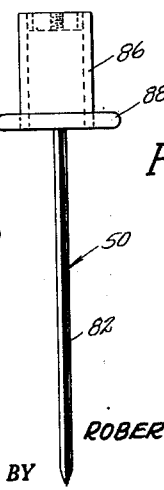
Figure 18 is an end elevational view of the blade.
Figure 9:
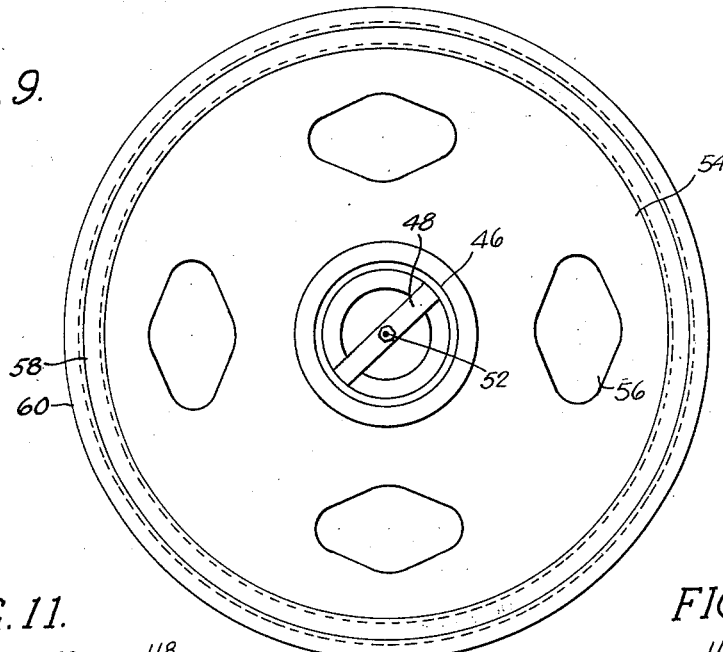
Figure 9 is a plan view of the drive drum.
Figure 11:
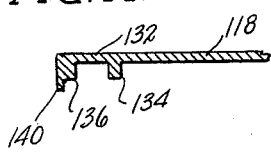
Figure 11 is a detailed cross sectional view taken on line 11—11 of Figure 10.
Figure 12:
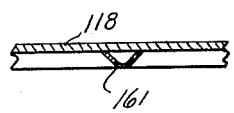
Figure 12 is a detailed sectional view taken on line 12—12 of Figure 10.
Figure 10:
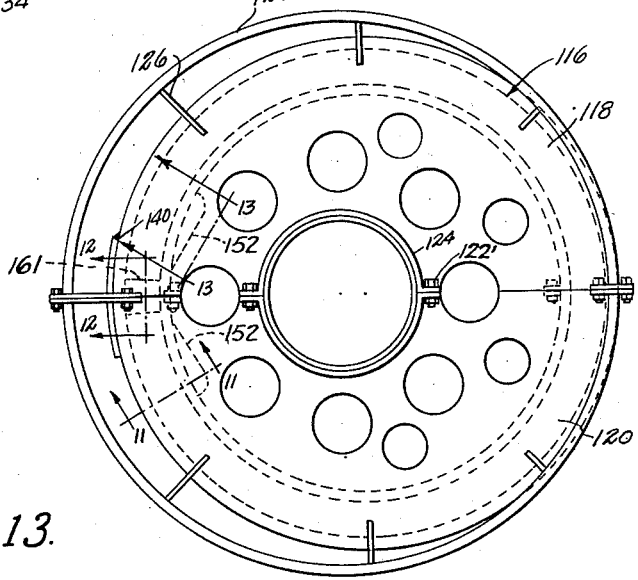
Figure 10 is a plan view of the steering drum.
Figure 13:
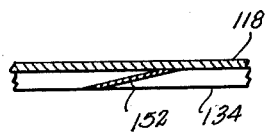
Figure 13 is a detailed sectional view taken on line 13—13 of Figure 10.

As seen in Figure 8 regarding the blade assembly at position A, guide pin A1 is engaged in the channel 132, with the opposing blade guide pin A2 being out of engagement therewith. Regarding the blade assembly at position C, guide pin C1 is engaged in the channel, while the blade guide pin C2 is out of engagement. Regarding the blade assembly at position B, guide pin B1 is at the point of disengagement from channel 132 and may be aided in this disengagement by the inclined projection 161, as seen in Figure 12, while the opposing blade guide pin B2 is at the point of engagement in channel 132, by means of arcuate vertical cam ledge 144, as shown in Figure 20. Regarding the blade assembly at position D, the blade guide pin D2 is engaged in channel 132 and the blade guide pin D1 being out of engagement therewith. However, assuming a progressive counter-clockwise rotation of the drive drum, the blade guide pin C2 is approaching the point where it becomes engaged in the channel 132. As noted, the blades 50 rotate on their own axes in an opposite direction to the drive drum 46. Hence, vertically inclined projections 152 are formed in the channel 132, adjacent to the flange 134, to insure the passage of the pins under the flange 134 and the reception thereof in the channel 132.

In Figure 1, a cargo vessel 154 is diagrammatically depicted, the same being provided with a plurality of cycloidal blade units 156, which are disposed in rows along the bilge thereof for propelling and stabilizing the vessel. By this arrangement, the machinery is concentrated at the point where the vessel is the strongest and an even distribution of the load at that point is obtained, also the propulsion force is applied in an even distribution. At the stern, two units 158 are mounted, the same controlling the steering of the vessel, except when docking. In between the opposed rows of units, is the cargo space and such provision of a cargo space, provides for greater stability of the vessel. Also, by staggering the propelling units along the sides of the vessel, the water expelled aft will have more time to effect its force on the surrounding water and the next propelling unit in line aft will not have to be revolved more rapidly in order to perform with equal efficiency. The safety of the vessel, as a unit, is increased by the compartmentation of the propelling units, which would be accessible at all times by a connecting gallery, and by the de-centralizing of the propelling system. Thus, the vessel can maintain motion and maneuverability even after considerable damage.

In Figures 3 and 4, the cycloidal units are disposed in transversely spaced side by side relationship and, in such position, provide propulsion means and stabilizing means for the vessel, which may be provided with a propeller and rudder assembly, independent of the cycloidal units.

In Figures 5 and 6, a small tow boat 160 is illustrated and is provided with a single cycloidal unit, which has been found to be efficient in the propulsion and steering of the boat.

I claim:

1. In a driven marine vessel including a hull wall having a vertical opening therein, a cycloidal propeller assembly comprising a retaining ring mounted on the hull wall interiorly of the hull and circumscribing the opening, bearing means mounted on the ring, a drive drum vertically mounted in the opening, a transverse bottom flange on said drum enclosing the opening and having an upstanding peripheral mounting flange rotatably journalled in the bearing means, blades rotatably mounted in the bottom flange and depending therefrom, said blades being moved by the drum about a common orbit, means carried by the drum for individually rotating the blades about their vertical axes to effect a change in the direction of propulsion, said bottom flange having equidistantly spaced variable openings formed therein, bearing sleeves mounted in said openings and having lateral mounting flanges secured to the upper face of the bottom flange, said blades having hubs rotatably disposed in the sleeves, and bar members transversely mounted on the upper ends of the hubs and rotatably rested on the upper ends of the sleeves, said last-named means including a plate rotatably mounted concentrically on the drum and paralleling the bottom flange, a depending channel formed on the periphery of the plate and disposed eccentrically to the axis of rotation of the plate and drum, means for rotating said plate about the rotating drum, said bar members having vertical openings in their opposing ends, vertical pins slidably disposed in the openings, and a cam member operatively connected to each of said bearing sleeves and selectively engageable with the pins of the adjacent bar member for raising said pins into engagement of the channel for transmitting rotation of the plate to the blades.

2. In a driven marine vessel including a hull wall having a vertical opening therein, a cycloidal propeller assembly comprising a retaining ring mounted on the hull wall interiorly of the hull and circumscribing the opening, bearing means mounted on the ring, a drive drum vertically mounted in the opening, a transverse bottom flange on said drum enclosing the opening and having an upstanding peripheral mounting flange rotatably journalled in the bearing means, blades rotatably mounted in the bottom flange and depending therefrom, said blades being moved by the drum about a common orbit, means carried by the drum for individually rotating the blades about their vertical axes to effect a change in the direction of propulsion, said bottom flange having equidistantly spaced vertical openings formed therein, bearing sleeves mounted in said openings and having lateral mounting flanges secured to the upper face of the bottom flange, said blades having hubs rotatably disposed in the sleeves, and bar members transversely mounted on the upper ends of the hubs and rotatably rested on the upper ends of the sleeves, said last-named means including a plate rotatably mounted concentrically on the drum and paralleling the bottom flange, a depending channel formed on the periphery of the plate, means for rotating said plate about the rotating drum and disposed eccentrically to the axis of rotation of the plate and drum, said bar members having vertical openings in their opposing ends, vertical pins slidably disposed in the openings, and means for raising said pins into engagement with the channel for transmitting rotation to the blades, said pin-raising means including cams mounted on the mounting flanges of the bearing sleeves.

3. In a driven marine vessel including a hull wall having a vertical opening therein, a cycloidal propeller assembly comprising a retaining ring mounted on the hull wall interiorly of the hull and circumscribing the opening, bearing means mounted on the ring, a drive drum vertically mounted in the opening, a transverse bottom flange on said drum enclosing the opening and having an upstanding peripheral mounting flange rotatably journaled in the bearing means, blades rotatably mounted in the bottom flange and depending therefrom, said blades being moved by the drum about a common orbit, means carried by the drum for individually rotating the blades about their vertical axes to effect a change in the direction of propulsion, said bottom flange having equidistantly spaced vertical openings formed therein, bearing sleeves mounted in said openings and having lateral mounting flanges secured to the upper face of the bottom flange, said blades having hubs rotatably disposed in the sleeves, and bar members transversely mounted on the upper ends of the hubs and rotatably rested on the upper ends of the sleeves, said last-named means including a plate rotatably mounted concentrically on the drum and paralleling the bottom flange, a depending channel formed on the periphery of the plate, means for rotating said plate about the rotating drum and disposed eccentrically of the axis of rotation of the drum and plate, said bar members having vertical openings in their opposing ends, vertical pins slidably disposed in the openings, a cam member operatively connected to each of said bearing sleeves and selectively engageable with the pins of the adjacent bar member for raising said pins into engagement of the channel for transmitting rotation to the blades, and a retaining ledge formed on the outer leg of the channel for engaging the bar members.

4. In a driven marine vessel including a hull wall having a vertical opening therein, a cycloidal propeller assembly comprising a retaining ring mounted on the hull wall interiorly of the hull and circumscribing the opening, bearing means mounted on the ring, a drive drum vertically mounted in the opening, a transverse bottom flange on said drum enclosing the opening and having an upstanding peripheral mounting flange rotatably journalled in the bearing means, blades rotatably mounted in the bottom flange and depending therefrom, said blades being moved by the drum about a common orbit, means carried by the drum for individually rotating the blades about their vertical axes to effect a change in the direction of propulsion, said bottom flange having equidistantly spaced vertical openings formed therein, bearing sleeves mounted in said openings and having lateral mounting flanges secured to the upper face of the bottom flange, said blades having hubs rotatably disposed in the sleeves, and bar members transversely mounted on the upper ends of the hubs and rotatably rested on the upper ends of the sleeves, said last-named means including a plate rotatably mounted concentrically on the drum and paralleling the bottom flange, a depending channel formed on the periphery of the plate and disposed eccentrically of the axis of rotation of the plate, means for rotating said plate about the rotating drum, said bar members having vertical openings in their opposing ends, vertical pins slidably disposed in the openings, and means for raising said pins into engagement of the channel for transmitting rotation to the blades, said pin-raising means including arcuate, inverted, T-shaped cam members mounted on the mounting flanges of the bearing sleeves.

5. In a marine vessel including a bottom hull wall provided with an opening, a cycloidal propeller assembly circumscribing said opening and operatively connected to said bottom hull wall, said assembly comprising an upstanding retaining ring circumscribing said opening and having the lower end fixedly supported on said bottom hull wall, a vertically disposed drive drum positioned axially of said opening and connected to said ring for rotary movement about said ring as an axis, the lower end of said drum having a transverse flange provided with a plurality of openings arranged in spaced relation thereabout, a vertically disposed bearing sleeve positioned axially of each of the openings in said transverse flange and fixedly secured to said flange, each of said sleeves having the lower end within the adjacent flange opening, an upstanding blade positioned below each of the openings in said transverse flange and having on its upper end a hub supported in the adjacent bearing sleeve for rotation about said sleeve as an axis, a cam plate paralleling said transverse flange and circumposed about said drive drum intermediate its ends thereof and connected to said drive drum for rotation therearound, a separate means operatively connected to each of said sleeves and the adjacent blade hub for individually rotating said blade about its axis to effect a change in the direction of propulsion, means on said cam plate selectively engageable with each of said separate means for effecting the individual rotation of each of said blades, and means operatively connected to said cam plate for effecting the rotational movement of said plate about said drive drum.

References Cited in the file of this patent

UNITED STATES PATENTS

| Number | Name | Date |
|---|---|---|
| 1,740,820 | Kirsten | Dec. 24, 1929 |
| 2,037,069 | Ehrhart | Apr. 14, 1936 |

FOREIGN PATENTS

| Number | Country | Date |
|---|---|---|
| 342,071 | Great Britain | Jan. 29, 1931 |
| 643,133 | Great Britain | Sept. 13, 1950 |
| 695,370 | Germany | Aug. 23, 1940 |
| 709,253 | Germany | Aug. 11, 1941 |